April 30, 1968   C. W. NEEFE   3,380,718
PROCESS FOR MOLDING HIGH QUALITY PLASTIC LENSES
Filed July 20, 1964
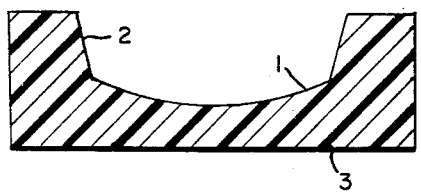
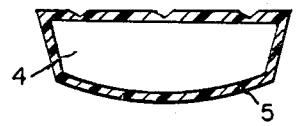
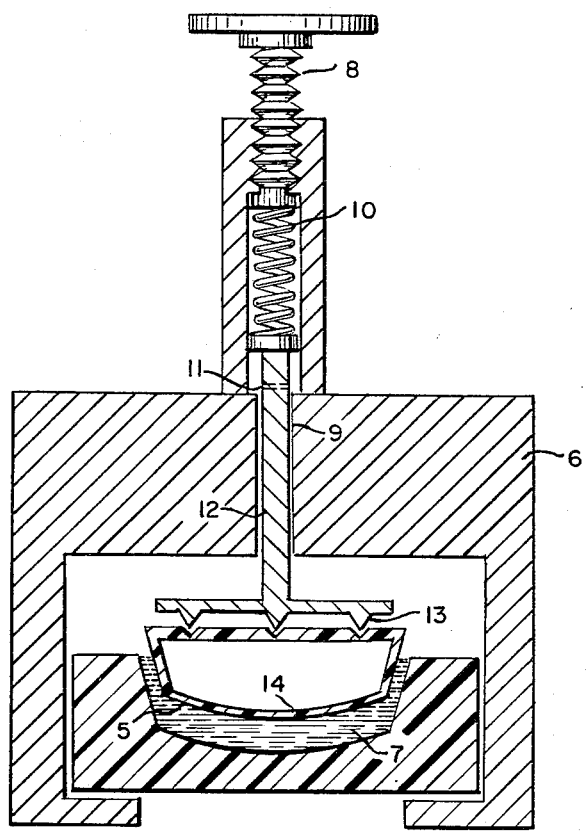
INVENTOR.
BY Charles W. Neefe

3,380,718
PROCESS FOR MOLDING HIGH QUALITY PLASTIC LENSES

Charles W. Neefe, Big Spring, Tex., assignor to Neefe-Hamilton Research Company, Big Spring, Tex.
Filed July 20, 1964, Ser. No. 383,898
1 Claim. (Cl. 264—1)

Plastic lenses offer many advantages over glass lenses. They are much lighter in weight and resist breakage. The cost of making high quality cast lenses has been high, due to the problems caused by the shrinkage of the monomer when polymerized.

Several methods have been developed in an attempt to overcome this shrinkage. The presently used process requires a flexible precision gasket, which cannot be reused. A new flexible precision gasket is required for each lens produced. A fixed holding pressure of small degree is applied to the mold in order to support the flexible precision gasket. This is expensive and produces lenses of medium quality.

The new herein disclosed process has many advantages which will be apparent as the disclosure proceeds. It is understood that this disclosure is merely illustrative and is in no way limiting and not confined to the exact features shown herein and changes in detail of construction are permissible without departing from the spirit of the invention and claim which follow.

Your attention is directed to the accompanying drawings, in which:

FIGURE 1 shows the plastic mold in section. The parts are as follows: 1, release film deposited upon the optical surface; 2, tapered sides; 3, epoxy mold body.

FIGURE 2 shows the inner float mold, and the parts are: 4, the air cavity; 5, the optical surface.

FIGURE 3 shows the assembled mold containing the lens material, and the parts are: 6, thickness control support; 7, liquid lens material; 8, thickness adjustment screw; 9, centering rod guide hole; 10, pressure spring; 11, guide rod index mark; 12, centering rod; 13, centering points; 14, convex mold.

This new process requires no sealing gasket and produces high quality lenses at a low cost with very few rejects.

These and other objects of this new invention will be fully apparent from the following description when taken in conjunction with the annexed drawing, in which: A concave mold is made of a plastic casting monomer to which a suitable catalyst has been added. Allyl diglycol carbonate or epoxy or polyester resin may be used for the concave mold material. The use of plastic concave molds made from a single glass master mold provides uniform concave molds. This is a great advantage in making trifocal and bifocal lenses. In this way all lenses produced will be exactly alike. All lenses will match as to segment size, shape, and position. With this process, lenses made years apart will always match. FIGURE 1 shows the concave mold in section.

A convex mold is made also of the same material. This convex mold is hollow and has a specific gravity lower than the liquid monomer used to make the lens. FIGURE 2 is a sectional view of the hollow convex mold.

The mold surfaces are coated with a release agent such as bees wax, stearic acid, or silicone. This provides for easy removal of the finished lens from the mold. The sides of concave and convex molds are also tapered to aid in removal of the finished lens.

A support for the lower concave mold and positioning device for the upper hollow convex mold is also provided as shown in FIGURE 3.

This new process for making high quality plastic lenses is carried out as follows:

The lower concave mold 3, FIGURE 1, has an inner optical surface 1, FIGURE 1, which is coated with a release agent 2, FIGURE 1, and polished to an optical quality finish. The prepared concave mold is filled with allyl diglycol carbonate to which has been added three percent isopropyl percarbonate and placed in the mold support 6, FIGURE 3. The hollow convex mold 5, FIGURE 2, containing an air space 4, FIGURE 2, is floated upon the liquid monomer 7, FIGURE 3. The convex mold positioning points 13, FIGURE 3, are lowered by turning screw 8, FIGURE 3, which applies pressure to spring 10, and forces centering rod 9 and convex mold 14, FIGURE 3, down into the liquid monomer 7 until index mark 11, FIGURE 3, is at top of mold support 6. At this point the liquid between the mold surfaces 3 and 5, will be the correct thickness. Heat of 50 degrees centigrade is applied until the liquid monomer is well within the gel stage. At this time the pressure screw, 8, is turned down to increase the pressure on spring 10, which forces the convex mold 14, FIGURE 3, against the congealed plastic lens material, and this prevents the plastic lens material from pulling away from the mold surfaces as polymerization continues. The plastic lens material in the gel stage will support the spring pressure without loss of thickness. The reduction in volume due to shrinkage upon polymerization must be added to the desired thickness when applying the index mark 11 to centering rod 9. The amount to be added will vary with the mol design and the viscosity of the gel and monomer used. For most lenses the total is 20 percent of the finished lens thickness. The heat is raised to 70 degrees centigrade and held until complete polymerization is obtained. The lens and mold are cooled slowly after which the lens is removed and the mold filled again for the next lens.

The increase of pressure after the gel stage is reached prevents the gel from separating from the mold surfaces and insures perfect lenses without surface or internal flaws. This mold pressure may be increased as the gel hardens. The temperature may be increased gradually as the gel hardens. A gradual increase in temperature speeds up the process. An increase in pressure improves the quality.

The plastic lens material undergoes much internal stress as it shrinks during the gel stage. This shrinkage and stress will separate the gel and cause it to pull away from the mold surface. The application of pressure equal to or exceeding the stress developed by the shrinking gel will prevent separation of the plastic lens material.

The addition of certain other unsaturated compounds to the allyl diglycol carbonate will produce copolymers which modify the properties of the finished plastic lens material. The addition of copolymerizing agents also can be used to modify the formation of the gel and rate of polymerization. The addition of 10 percent methyl methacrylate to the allyl diglycol carbonate will greatly accelerate the formation of a stable gel. This reduces the time required to produce a finished lens.

The addition of two or more organic peroxide catalysts can improve the properties and hardness of the finished lenses. Isopropyl percorbonate may be used with methyl ethyl ketone peroxide. Isopropyl percarbonate has a half life of one hour at 60 degrees centigrade. Methyl ethyl ketone peroxide has a half life of one hour at 125 degrees centigrade, and a half life of over 500 hours at 60 degrees centigrade. Lenses may be produced from a monomer containing both isopropyl percarbonate and methyl ethyl ketone peroxide by slowly raising the temperature of the monomer to 60 degrees centigrade, activating the isopropyl percarbonate, polymerizing the monomer to a solid, and removing the lens from the mold and reheating it to 125 degrees centigrade, activating the methyl ethyl ketone peroxide. This two stage process produces a completely polymerized plastic lens material of very high surface hardness and scratch resistance.

While I have thus described my invention, I do not wish to be limited to the precise details described, as changes may be readily made without departing from the spirit of my invention, but having thus described my invention, I claim as new and desire to secure by Letters Patent the following:

1. A process for making high quality plastic lenses from a monomer and two catalysts, one having a lower reaction temperature than the other and each capable of polymerizing said monomer comprising filling a concave mold with the liquid monomer and floating a convex mold upon the liquid monomer and applying pressure to the convex mold forcing said convex mold into the liquid monomer whereby the desired thickness of liquid monomer is present between the mold surfaces and heating the monomer to activate the lower temperature catalyst until a gel is formed and applying additional pressure to the convex mold forcing the mold surfaces against the gel material and increasing the pressure as the gel thickens into a solid and applying additional heat to activate the higher temperature catalyst and to complete the polymerization.

References Cited

UNITED STATES PATENTS

| 3,056,166 | 10/1962 | Weinberg | 264—1 |
| 3,211,811 | 10/1965 | Lanman | 264—1 |

FOREIGN PATENTS

| 597,171 | 5/1960 | Canada. |

ALEXANDER H. BRODMERKEL, *Primary Examiner.*

A. H. KOECKERT, *Assistant Examiner.*